Oct. 30, 1928.
E. SCHÜFFTAN
1,690,039
ART OF MAKING MOTION PICTURES
Original Filed Sept. 15, 1923     2 Sheets-Sheet 2
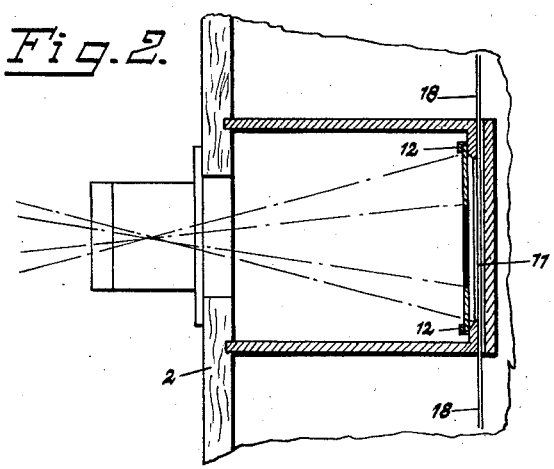
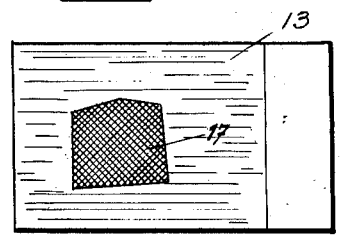
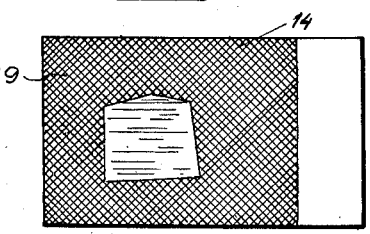
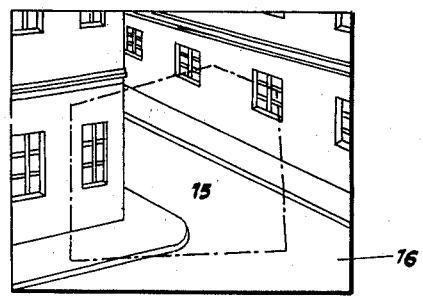
Witnesses
Inventor
Eugen Schüfftan
per:
Attorney Patented Oct. 30, 1928.

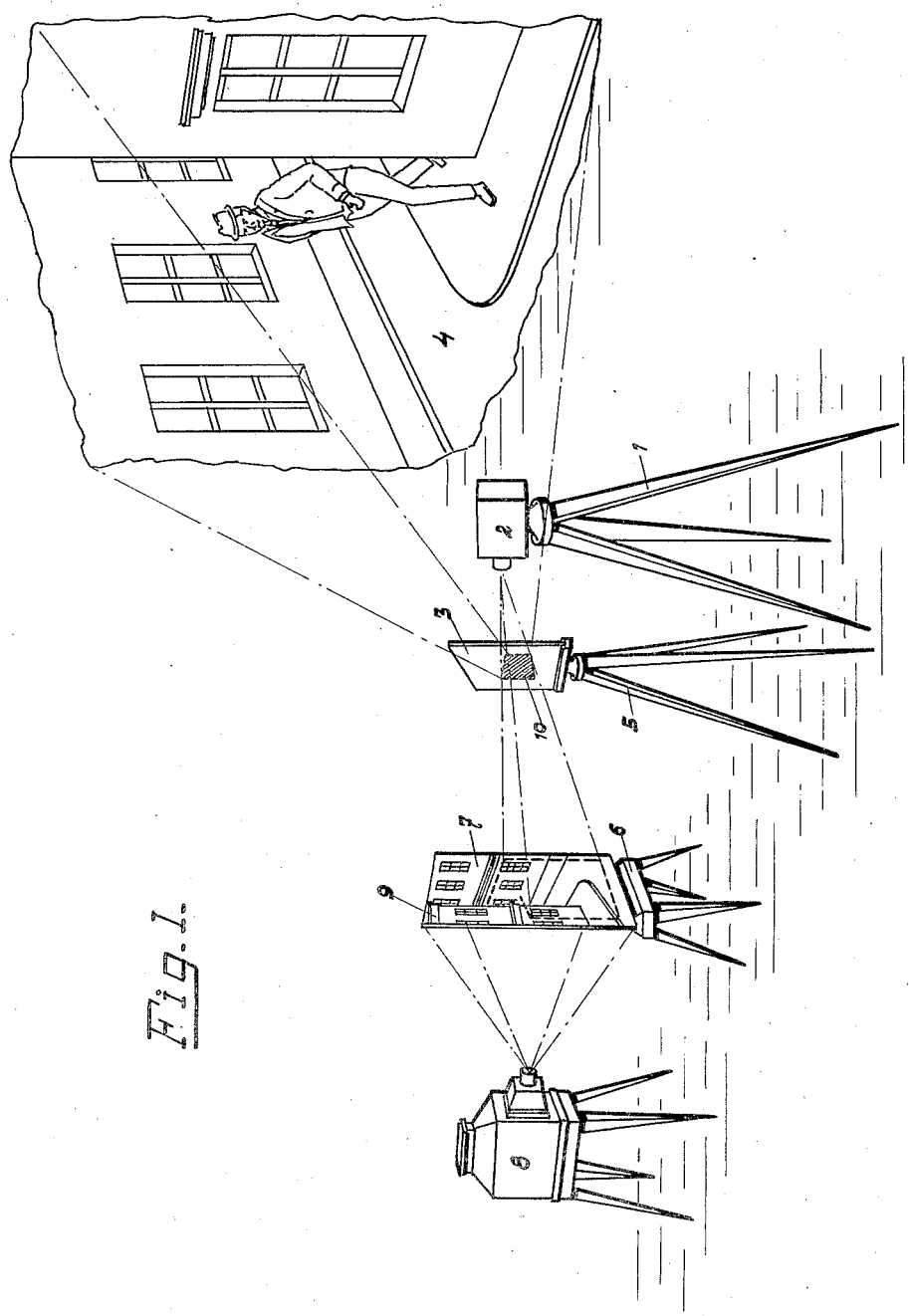

1,690,039

UNITED STATES PATENT OFFICE.

EUGEN SCHÜFFTAN, OF BERLIN-WILMERSDORF, GERMANY.

ART OF MAKING MOTION PICTURES.

Original application filed September 15, 1923, Serial No. 663,011, and in Germany September 13, 1922. Divided and this application filed September 5, 1925. Serial No. 54,731.

This application is a division of Patent No. 1,569,789, granted January 12, 1926, (Reissue No. 16,446, granted October 26, 1926) for which I have filed applications as follows in Germany, September 13, 1922, Serial K. 83291 VI/57b²; February 10, 1923, Serial K. 84,844 VI/57b²; May 9, 1923, Serial K. 85,851, VI/57a²; July 14, 1923, Serial K. 86,578 VI/57a².

This invention relates broadly to the making of motion pictures in which a composite picture is produced only a part of which represents an image of a natural object, and it refers in particular to the art of producing cinematographic or moving picture photographs from composite, scenery containing objects, as set forth in Patent No. 1,569,789, granted January 12, 1926, (Reissue No. 16,-446, granted October 26, 1926), and in which only a portion of the object to be represented is in full natural size, while other portions of the objects, models or the like, are on a scale, different from the rest of the object, the various portions being so combined and united that the resulting composite picture will produce the same impression as though it has been obtained from a unitary object of natural size. In accordance with previous suggestions, of combining partial objects of natural size with models, photographs or the like on a smaller scale, it has been attempted to combine the various sections into a unitary picture by a reflecting glass plate; with this suggestion and other methods of the previous art there has been, however, the inconvenience that the reflecting glass plate, in view of its reflecting both at its front as well as at its rear sides, produces double images which it is impossible to combine into unitary pictures without a halo, and there is the further inconvenience that, in view of the comparatively reduced reflection which can be obtained with an ordinary glass plate, the images are dulled particularly in that portion thereof which is obtained by reflection, and it is impossible to so blend the different sections of the picture as to obviate the effects of difference of illumination.

In view thereof, it is one of the main objects of my invention to provide means of obviating these difficulties and to produce an absolutely unitary composite picture without the disturbing effect of differences of light and halo, and furthermore to generally improve and facilitate the methods of manufacture of pictures and picture films of the kind referred to, and to produce a more real stereometric bodily impression than could be obtained by the methods of the previous art above referred to. With these and other objects in view, the reflection is produced, according to my invention, by actual mirrors, that is to say, mirrors which are provided at one of their sides, preferably the front side with a reflecting mirror surface. In the preferred embodiment of the invention in which the surface confronting the photographic camera is provided with the reflecting mirror coating or the like, the important result is accomplished that the disturbing influence of refraction or reflection on the uncoated front surface of the glass plate which is liable to occur in the usual mirrors with rearwardly disposed reflecting surface is eliminated. In further pursuance of my invention and in the preferred embodiment thereof semi-transparent or translucent mirrors are used, that is to say, mirrors which are provided with such a very thin reflecting coating that said coating, upon looking on the mirror before a light back-ground will appear as perfectly transparent, while, if viewed upon a black or opaque back-ground, the effect will be that of a perfect mirror.

In the practice of my invention, and generally speaking in making use of the reflection of a partial object as a means of building up the final picture models which, by the way, are generally carried out on a smaller scale both for reasons of economy and transportation and for other reasons frequently fail to produce a satisfactory representation of the bodily impression of the particular object, thus for instance in the case of classical and other buildings which have undergone the ravaging and, so to speak, individualizing influences of time and of the atmosphere, or, in case the supplemental object is to represent moving parts of a landscape, such as a maritime scene with sea in motion or trees agitated by the storm or the like. This difficulty is obviated in accordance with my invention by replacing the otherwise used model bodily by an immovable or a moving picture, a photograph or an illuminated diapositive or lantern slide arranged behind the mirror. The image in these cases is preferably produced by projecting the same upon a translucent special projecting surface which is disposed at the rear of the mirror. In the case of the employment of a semi-transparent mirror such pictures may be projected directly upon the back-side of the mirror itself. It is advisable to reduce the scale of such projection pictures, so that loss of light which would be liable to occur when made on a larger scale and which would interfere with the satisfactory reproduction by photography is avoided. However, the projection pictures should be of sufficiently large size themselves, inasmuch as they should be disposed at a sufficient distance from the lens of the photographic camera, as to allow of being pictured together with the reflected portion of the natural object with one adjustment of the objective lens and with sufficient distinctness and deepness of shade. Wherever it is impossible or difficult to produce projection pictures of the required size without resorting to a subsequent adjustment of the lens of the photographic camera, it will be found of advantage to effect the taking of the picture by the mirror and the taking of the picture by projection at different times and separately from each other. In view thereof and in further pursuance of my invention, use is made of masks or similes corresponding to different sections of the picture and one of which, for instance, is adapted to cover up all those portions of the picture of the natural object which it is not desired to reproduce by the reflection of the mirror, while another mask or simile which may be adapted to complement the other mask into a silhouette or the like of the entire natural object will operate to cover up the remaining corresponding portions of the diapositive or projection picture.

In accordance therewith the cinematographic picture in an exemplification of my invention may be taken in such a manner that a picture is prepared first of the parts to be reproduced in natural size of the object under consideration by means of the mirror, whereupon a separate picture is prepared of the supplemental portion by means of the diapositive or of the projection picture. In the first stage of this process all those parts of the natural object to be reproduced by the diapositive or by the projection are rendered inactive by the covering up of the picture window of the camera at the corresponding points. In the succeeding stage the film ribbon is turned back and the supplemental mask is inserted in the camera so as to cover up the previously reproduced portion. By operating in this manner two separate pictures are obtained in succession upon the same film ribbon and on complemental portions which are combined and blended into the correct film picture. The entire procedure may also be performed in the inverse order.

For the carrying out of the method according to this invention it is important to employ only mirrors possessing a reflecting coat by which a sufficient satisfactory mirror action is insured. In case of the employment of opaque mirrors, the reflecting mirror coat is removed from the glass plate carrying such coating, so that only that portion of the mirror coating remains which is necessary for the reflection of the object of natural size. When using a semi-transparent mirror, however, it is sufficient to dispose the masks between the mirror and the objects, in order to produce the same effect as in the case of mirrors.

In the case of projection pictures arranged at the rear of the mirror or when the projection is produced on the back side of the semi-transparent mirror, the mirror and the projecting surface should be kept in the dark, inasmuch as any foreign incident light will greatly interfere with the sharpness of the pictures.

The invention will be more fully described with reference to the accompanying drawing showing by way of exemplification and in a diagrammatic manner in Fig. 1 the entire arrangement of the different pieces of apparatus and of the object. Fig. 2 is a sectional view through a part of the camera; Fig. 3 is a diagram of a mask used in connection with this invention, and by way of exemplification. Fig. 4 is the complement of the mask shown in Fig. 3 and Fig. 5 represents the total picture produced by the apparatus.

By means of the photographic camera 2 which is mounted on the support 1 the scenery 4 is photographed with the aid of the mirror 10 mounted on a face of a transparent member 3, the scenery being in its natural size. The transparent member is adjustably supported on the feet 5. In the straight, unbroken line of vision extending from the camera 2 through the transparent member 3 a support 6 is mounted behind the mirror 10 and carrying the picture 7. This picture may either be a photograph, a diapositive or lantern slide or a projected picture. In the example shown on the drawing, a projected picture is used. This picture 7 is projected by the projection apparatus 8 on the back side of the translucent screen 9 and is so positioned as to be clearly and sharply defined on the side confronting the transparent member 3 and the back of the mirror 10. This mirror will only reflect at the middle portion of the transparent member 3 indicated by hatching in the drawing, while the remaining portion of the mirror consists of clear transparent glass. The photographic camera 2 will therefore only be able to reproduce that portion of the projection picture 7 which has not been covered up by the reflecting surface 10 and the remainder will be complemented by the reflection of the actual scenery 4. In the case of the employment of a semi-transparent mirror, that portion of the mirror confronting the camera 2 which corresponds to the section 10 is provided with a black coat or mask, in order to produce at this portion a complete mirror action of the scenery 4 in the apparatus 2.

In order to be able to photograph the two objects 4 and 7 separately of each other and at different times, the arrangement may be as shown in Figs. 2 to 5 in which in front of the picture window 11 of the camera 2 a guide 12 is provided adapted for the reception of exchangeable masks 13 and 14. The finished picture, as appears from Fig. 5, shows a street corner without the acting persons which appear at 4. The section 15 included in the dash-and-dot lines corresponds to the object 4 and the surrounding portion 16 of the complemental picture to the object 7.

The procedure is substantially as follows:—One may start with first photographing the object 7 which is a projection picture, a diapositive, photograph or the like, and for this purpose the mask 13 is inserted in the camera. This mask preferably comprises a thin glass plate or the like upon which that portion 17 which corresponds to the natural object 4 is concealed by a black coat, so that upon the film ribbon 18 only that picture is obtained which corresponds to the section 16 of the picture in accordance with Fig. 5. Thereupon the film ribbon 18 is turned back and, instead of the mask 13, the mask 14 is positioned in front of the picture window 11. Now, the object 4 is photographed by means of the mirror 10, while a black coat 19 covers up the already illuminated portion 16 of the picture and prevents the action of light thereon and the portion 15 now receives the reproduction of the particular portion of the object 4.

In order to produce a proper fitting of the different parts of the total picture in the mounting and adjusting of the object 4 and of the mirror 10 and the camera 2, the film ribbon 18 is replaced by a ground disc upon which the exact adjustment of the two objects 4 and 7 and of the mirror 10 is effected.

The invention has been described and shown in its broad aspects and by way of exemplification only and it should, of course, be understood that it is not restricted to any particular form and arrangement of apparatus and parts, except as appears from the appended claims.

It will be appreciated that the specific forms of mechanism shown in Figures 2 to 4 inclusive are merely illustrative of means for carrying out the method claimed in this case and which was described and claimed in my Patent No. 1,569,789, granted January 12, 1926 (Reissue No. 16,446, granted October 26, 1926), and of which the present application is a division.

I claim:—

1. The art of making composite motion pictures of a set or scene and a second set or scene which is complementary to the first set or scene which comprises disposing the first set or scene within range of a camera, masking a portion of said first set or scene with a reflecting surface mounted on a transparent member having a greater area than the reflecting surface, photographing the unmasked portion of the first set or scene directly through the transparent member on a series of frame of a film while masking those portions of the frame which are unaffected by the light rays, arranging the complementary set or scene so that an image of said set or scene will be reflected into the camera, fitting and adjusting the image of the complementary set or scene with the image of the first set or scene on the frame so that the images will form a composite coordinated image and then photographing the reflected image of the complementary set or scene on the same successive frame in the camera, while masking those portions of the frame which have been previously affected by light rays, and blending the meeting edges of the images into each other.

2. The art of making composite motion pictures of a set or scene and a second set or scene which is complementary to the first set or scene which comprises disposing the first set or scene within range of a camera, arranging a transparent member between the camera and the first set or scene, the transparent member having a portion of its surface covered with a reflecting member directly facing the camera, with the reflecting member masking a portion of the miniature reproduction, photographing the unmasked portion of the miniature reproduction directly through the transparent member on a series of frames of a film in the camera, while masking those portion of the frames which are unaffected by the light rays arranging the complementary set or scene at an angle to the transparent member and at such a distance from the reflecting surface on the transparent member that an image of the second set or scene will be reflected in the camera, and photographing the reflected image of the second set or scene on the same series of frames of the film and while masking those portions of the frames which have been previously affected by light rays and blending the meeting edges of the images into each other.

3. The art of making composite motion pictures of a diapositive of a set or scene and a second set or scene complementary to the set or scene depicted by the diapositive which comprises arranging the diapositive in line with a transparent member and a camera with the transparent member disposed between the diapositive and said camera, arranging a reflecting surface on a portion of the transparent member so that a portion of the diapositive will be masked by the reflecting surface, then arranging the second set or scene at an angle to the transparent member so that an image of the second set or scene will be reflected into the camera to supplement the unmasked portion of the image of the diapositive, photographing the unmasked portion of the diapositive directly through the transparent member on a series of frames in a camera, while masking those portions of the frames which are unaffected by the light rays then photographing on the same series of frames the reflected image of the second set or scene, while masking those portions of the frames which have been previously affected by light rays, and blending the meeting edges of the images into each other.

4. The art of making composite motion pictures of a set or scene and a second set or scene complementary to the first mentioned set or scene which comprises disposing the miniature reproduction within range of a camera, arranging between the camera and the first set or scene a reflecting surface mounted on a transparent member having a greater area than the reflecting surface that the transparent member will extend beyond the periphery of the reflecting surface while masking a portion of said set or scene with the reflecting member, masking a portion of a frame in the camera which corresponds to the masked portion of the first set or scene, then photographing directly through the transparent member the unmasked portion of the first set or scene, arranging the second set or scene so that an image of said set or scene will be reflected by the reflecting surface into the camera, masking that portion of each frame of the film which corresponds to the unmasked portion of the first set or scene, then photographing the reflected image of the second set or scene on the unmasked portions of the frames of the film, and blending the adjacent edges of the images of the first set or scene and the second set or scene into each other.

5. The art of making composite motion pictures of a miniature reproduction of a set or scene and a full sized set or scene complementary to the miniature reproduction which comprises arranging the miniature reproduction within range of a camera, masking a portion of said miniature reproduction with a reflecting surface mounted on a face of a transparent member which is located between the miniature reproduction and the camera, said face of the transparent member carrying the reflecting surface being disposed towards the camera, the transparent member having a greater area than the reflecting surface, photographing directly the unmasked portion of the miniature reproduction through the transparent member on a series of frames of the film in the camera, while masking those portions of the frame which are unaffected by the light rays, arranging the full sized set or scene in a position so that an image of the full sized set or scene will be reflected into the camera, photographing on the successive frames of the film the reflected image of the full sized set or scene, while masking those portions of the frames which have been previously affected by the light rays, and blending the meeting edges of the images into each other.

EUGEN SCHÜFFTAN.